United States Patent
Lu et al.

(10) Patent No.: US 8,996,872 B2
(45) Date of Patent: Mar. 31, 2015

(54) CONTACTLESS SEED PROGRAMMING METHOD AND SYSTEM THEREOF

(71) Applicant: Feitian Technologies Co., Ltd., Beijing (CN)

(72) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 0 days.

(21) Appl. No.: 14/116,379

(22) PCT Filed: Dec. 25, 2012

(86) PCT No.: PCT/CN2012/087429
§ 371 (c)(1),
(2) Date: Nov. 8, 2013

(87) PCT Pub. No.: WO2014/005414
PCT Pub. Date: Jan. 9, 2014

(65) Prior Publication Data
US 2014/0298029 A1    Oct. 2, 2014

(30) Foreign Application Priority Data

Jul. 2, 2012 (CN) .......................... 2012 1 0227765

(51) Int. Cl.
H04L 9/32     (2006.01)
H04L 9/08     (2006.01)
H04L 29/06    (2006.01)

(52) U.S. Cl.
CPC ............ *H04L 9/3213* (2013.01); *H04L 9/0891* (2013.01); *H04L 9/3271* (2013.01); *H04L 2209/805* (2013.01); *H04L 63/0853* (2013.01); *H04L 9/0869* (2013.01)

USPC ........... 713/172; 713/165; 713/168; 713/189; 713/193; 380/44; 726/6; 726/7; 726/8; 726/9

(58) Field of Classification Search
USPC ........................................................ 713/172
See application file for complete search history.

(56) References Cited

U.S. PATENT DOCUMENTS 7,260,215 B2 *   8/2007   Troyansky et al. ............. 380/28
7,360,091 B2 *   4/2008   Aikawa et al. ................. 713/172

(Continued)

FOREIGN PATENT DOCUMENTS

CN    102025716 A    4/2011
CN    102394752 A    3/2012

OTHER PUBLICATIONS

John R. Vacca, "Managing Information Security" Mar. 2010.*

(Continued)

*Primary Examiner* — Yonas Bayou
(74) *Attorney, Agent, or Firm* — Harness, Dickey & Pierce, P.L.C.

(57) ABSTRACT

The invention discloses a contactless seed programming method, belonging to information security field. In the method, a seed programming device obtains a token ID of a dynamic token, obtains corresponding first seed data according to the token ID, communicates with the dynamic token contactlessly, obtains first seed data from the dynamic token, decrypts the first seed data so as to obtain second seed data, encrypts the second seed data with the first data so as to obtain third seed data and sends the third seed data to the dynamic token; and the dynamic token decrypts the seed and updates seed stored in itself. By the invention, programming operation is simplified and programming efficiency is improved by communicating with the dynamic token contactlessly and security is ensured by transferring the encrypted seed during communication between the programming device and the token.

20 Claims, 5 Drawing Sheets

(56) References Cited

U.S. PATENT DOCUMENTS

| | | | |
|---|---|---|---|
| 7,885,407 B2* | 2/2011 | Shimosato et al. | 380/201 |
| 8,082,452 B2* | 12/2011 | Jajodia | 713/193 |
| 8,205,080 B2* | 6/2012 | Calamera et al. | 713/168 |
| 8,296,835 B2* | 10/2012 | Calamera et al. | 726/9 |
| 8,589,680 B2* | 11/2013 | De Atley et al. | 713/165 |
| 2001/0054148 A1* | 12/2001 | Hoornaert et al. | 713/172 |
| 2005/0015588 A1* | 1/2005 | Lin et al. | 713/159 |
| 2006/0259786 A1* | 11/2006 | Mizuno et al. | 713/193 |
| 2008/0123843 A1* | 5/2008 | Machani | 380/44 |
| 2010/0217921 A1* | 8/2010 | Mun | 711/103 |
| 2012/0284589 A1* | 11/2012 | Kim et al. | 714/785 |

OTHER PUBLICATIONS

Sajal K. Das et al., "Handbook on Securing Cyber-Physical Critical Infrastructure, 1st edition" Jan. 2012.*
International Search Report and Written Opinion (both in Chinese only) for PCT/CN2012/087429, mailed Apr. 18, 2013; ISA/CN.

* cited by examiner

CONTACTLESS SEED PROGRAMMING METHOD AND SYSTEM THEREOF

CROSS-REFERENCE TO RELATED APPLICATIONS

This application is a 371 U.S. National Stage of International Application No. PCT/CN2012/087429 filed on Dec. 25, 2012, which claims priority to Chinese Patent Application No. 201210227765.X, filed on Jul. 2, 2012. The contents of the above applications are incorporated herein by reference in their entirety.

FIELD OF THE INVENTION

The invention relates to information security field and in particularly, to a contactless seed programming method and a system thereof.

BACKGROUND OF THE INVENTION

The present seed programming device programs a seed by a probe manner after scanning a barcode of a token by a barcode scanner and obtaining the seed according to the barcode of the token.

In process of implementing the invention, the inventors find at least shortcomings in prior art as below: the manner of scanning the token barcode by a barcode scanner is difficult to control; the probe manner of programming by a probe requires high performance on a clamp and has a high dependence on an operator; and for the contact programming method, it requires programming first and packaging subsequently, which leads to a complex manufacturing process and a low programming efficiency.

SUMMARY OF THE INVENTION

The invention provides a contactless seed programming method and a device, so as to improve programming efficiency.

In order to meet the above purpose, the embodiment of the invention applies the following steps.

A seed programming method is disclosed, and the method includes steps of:

obtaining, by a programming device, a token ID of a dynamic token;

obtaining, by the programming device, first seed data according to the token ID, connecting and communicating with the dynamic token contactlessly, and obtaining first data from the dynamic token;

decrypting, by the programming device, the first seed data so as to obtain second seed data, and encrypting the second seed data according to the first seed data so as to obtain third seed data;

sending, by the programming device, the third seed data to the dynamic token contactlessly; and decrypting, by the dynamic token, the third seed data according to the first seed data stored in the dynamic token so as to obtain the second seed data, and updating seed data stored in the dynamic token according to the second seed data.

The step of updating, by the dynamic token, seed data stored in the dynamic token according to the second seed data includes:

updating, by the dynamic token, the seed data stored in the dynamic token according to the second seed data in case that the dynamic token determines that the second seed data is valid;

and before the dynamic token updates seed data stored in the dynamic token according to the second seed data, the method further includes:

determining, by the dynamic token, whether the second seed data is valid.

After the dynamic token determines whether the second seed data is valid, the method further includes:

displaying, by the dynamic token, error information in case that the dynamic token determines that the second seed data is invalid.

The step of determining, by the dynamic token, whether the second seed data is valid includes:

reading, by the dynamic token, a value of a flag bit in a predetermined position from the second seed data, and determining whether the read value of the flag bit is identical to a predetermined value stored in the dynamic token, if yes, determining the second seed data is valid; otherwise, determining the second seed data is invalid.

The step of updating, by the dynamic token, seed data stored in the dynamic token according to the second seed data includes:

processing, by the dynamic token, the second seed data, and updating the seed data stored in the dynamic token according to the processed second seed data.

After the step of obtaining, by the programming device, first seed data corresponding to the dynamic token from the dynamic token, the method further includes:

connecting and communicating, by the programming device, with a standard time device and obtaining GPS time information from the standard time device, encrypting the GPS time information according to the first data and sending the encrypted GPS time information to the dynamic token contactlessly; and decrypting, by the dynamic token, received GPS time information according to the first data stored in itself and updating GPS time information of the dynamic token to be decrypted GPS time information.

The step of obtaining, by the programming device, the first seed data according to the token ID includes:

obtaining, by the programming device, first seed data according to the token ID in case that the programming device determines that there is a dynamic token in a token slot according to a return value of the token ID;

and before the step of obtaining, by the programming device, the first seed data according to the token ID, the method further includes:

obtaining, by the programming device, the return value of the token ID and determining whether there is a dynamic token in the token slot according to the return value of the token ID.

After the step of determining, by the programming device, whether there is the dynamic token in the token slot according to the return value of the token ID, the method further includes:

obtaining, by the programming device, the token ID again in case that the programming device determining that there is no dynamic token in the token slot according to the return value of the obtained token ID.

The step of obtaining, by the programming device, first seed data according to the token ID includes:

obtaining, by the programming device, the token ID of the dynamic token when the programming device determines that the dynamic token is satisfied with a programming condition according to token information of the dynamic token;

and before the step of obtaining, by the programming device, the token ID of the dynamic token, the method further includes:

sending, by the programming device, a token detecting instruction to the dynamic token, obtaining the token information and determining whether the dynamic token is satisfied with the programming condition according to the token information.

After step of determining, by the programming device, whether the dynamic token is satisfied with the programming condition according to the token information, the method further includes:

obtaining, by the programming device, the token ID again in case that the programming device determines that the dynamic token is not satisfied with the programming condition according to the token information.

Before the step of sending, by the programming device, the third seed data to the dynamic token contactlessly, the method further includes:

obtaining, by the programming device, a pulse frequency and frequency of the dynamic token and writing a frequency deviation value between the pulse frequency and frequency of the dynamic token into the dynamic token; and calibrating, by the dynamic token, frequency of the dynamic token according to the frequency deviation value.

After the step of sending, by the programming device, the third seed data to the dynamic token contactlessly, the method further includes:

obtaining, by the programming device, the token ID and a token password of the dynamic token and obtaining corresponding first seed data according to the token ID;

decrypting, by the programming device, the first seed data so as to obtain second seed data and computing a token password according to the second seed data; and determining, by the programming device, whether the computed token password is identical to the obtained token password, if yes, determining that the seed is programmed successfully; otherwise, determining that the seed is not programmed successfully.

After the step of sending by the programming device, the third seed data to the dynamic token contactlessly, the method further includes:

receiving, by the programming device, a token processing ID from the dynamic token and determining that the seed is programmed successfully in case that value of the token ID is a seventh predetermined value.

After the step of determining, by the programming device, that the seed is programmed successfully, the method further includes:

storing, by the programming device, a programming record and the token ID in a pre-storing unit;

and the step of obtaining, by the programming device, first seed data according to the token ID includes:

obtaining, by the programming device, first seed data according to the token ID after determining that the token ID is not included in the pre-storing unit;

and before the step of obtaining, by the programming device, first seed data according to the token ID, the method further includes:

determining, by the programming device, whether the token ID is included in the pre-storing unit.

After the step of determining, by the programming device, whether the token ID is included in the pre-storing unit, the method further includes:

obtaining, by the programming device, the token ID again after determining that the token ID is included in the prestoring unit.

The step of obtaining, by the programming device, the token ID of the dynamic token includes:

obtaining, by the programming device, the token ID of the dynamic token by an OCR (Optical Character Recognition) or a barcode scanner.

The step of obtaining, by the programming device, first seed data according to the token ID includes:

obtaining, by the programming device, first seed data corresponding to the token ID through a card reader, a USB interface or an SATA interface.

A seed programming system is disclosed, and the seed programming system includes a programming device and a dynamic token, wherein the programming device includes:

a first obtaining module configured to obtain a token ID of the dynamic token;

a second obtaining module configured to obtain corresponding first seed data according to the token ID;

a third obtaining module configured to connect and communicate with the dynamic token contactlessly and obtain first data from the dynamic token;

a first decrypting module configured to decrypt the first seed data so as to obtain second seed data;

an encrypting module configured to encrypt the second seed data according to the first data so as to obtain the third seed data; and a sending module configured to send the third seed data to the dynamic token contactlessly; and the dynamic token includes:

a first receiving module configured to receive the third seed data from the programming device contactlessly;

a second decrypting module configured to decrypt the third seed data according to the first data stored in the dynamic token so as to obtain the second seed data; and an updating module configured to update seed data stored in the dynamic token according to the second seed data.

In the system, specifically, the updating module is configured to update seed data stored in the dynamic token according to the second seed data in case that the second seed data is valid; and the dynamic token further includes a determining module configured to determine whether the second seed data is valid The dynamic token further includes:

a first displaying module configured to display error information when the determining module determines that the second seed data is invalid.

The determining module is specifically configured to read a value of a flag bit in a predetermined position from the second seed data and determine whether the read value of the flag bit is identical to a predetermined value stored in the dynamic token, if yes, determine that the second seed data is valid; otherwise, determine that the second seed data is invalid.

The updating module is specifically configured to process the second seed data and update the seed data stored in the dynamic token with the processed seed data.

The programming device further includes a fourth obtaining module configured to connect and communicate with a standard time device and obtain GPS time information from the standard time device;

wherein the encrypting module is further configured to encrypt the GPS time information according to the first data;

the sending module is further configured to send the encrypted GPS time information to the dynamic token contactlessly;

the second decrypting module is further configured to decrypt the received GPS time information according to the first data stored in the dynamic token; and the updating module is further configured to update the GPS time information of the dynamic token to be decrypted GPS time information.

The programming device further includes a fifth obtaining module configured to obtain GPS status and a second displaying module configured to display the GPS status.

The second obtaining module is specifically configured to obtain corresponding first seed data according to a token ID after determining that there is a dynamic token in a token slot according to a return value of the token ID obtained by the programming device;

and the programming device further includes:

a sixth obtaining module configured to obtain the return value of the token ID; and a first determining module configured to whether there is a dynamic token in the token slot according to the return value of the token ID.

The first obtaining module is further configured to obtain the token ID again in case that the first determining module determines that there is no dynamic token in the token slot.

The first obtaining module is specifically configured to obtain the token ID of the dynamic token in case that the dynamic token is satisfied with a programming condition;

and the programming device further includes:

a seventh obtaining module configured to send token a detecting instruction to the dynamic token and obtain token information; and a second determining module configured to determine whether the dynamic token is satisfied with a programming condition according to the token information;

The first obtaining module is further configured to obtain the token ID again in case that the dynamic token is not satisfied with the programming condition.

The programming device further includes:

an eighth obtaining module configured to obtain a pulse frequency and frequency of the dynamic token; and a writing module configured to write a frequency deviation value between the pulse frequency and frequency of the dynamic token into the dynamic token;

and the dynamic token further includes:

a calibrating module configured to calibrate frequency of itself according to the frequency deviation value.

The programming device further includes:

a ninth obtaining module configured to obtain the token ID of the dynamic token and a token password of the dynamic token and obtain corresponding first seed data according to the token ID;

a computing module configured to compute a token password according to the second seed data; and a third determining module configured to determine whether the computed token password is identical to the obtained token password, if yes, determine that the seed is programmed successfully; otherwise, determine that the seed is not programmed successfully.

The programming device further includes:

a second receiving module configured to receive a token processing ID from the dynamic token and determine that the seed is programmed successfully in case that value of the token processing ID is a seventh predetermined value.

The programming device further includes:

a storing module configured to store a programming record and the token ID into a pre-storing unit after determining that the seed is programmed successfully;

and the second obtaining module is specifically configured to obtain corresponding first seed data according to the token ID in case that the token ID is not included in the pre-storing unit;

and the programming device further includes a fourth determining module configured to determine whether the token ID is included in the pre-storing unit.

The first obtaining module is further configured to obtain the token ID again in case that the fourth determining module determines that the token ID is included in the pre-storing unit.

The first obtaining module is further configured to obtain the token ID of the dynamic token by an OCR (Optical Character Recognition) or a barcode scanner.

The second obtaining module is specifically configured to obtain the first seed data corresponding to the token ID through a card reader, a USB interface or an SATA interface.

The invention has the following advantages: by the contactless seed programming method and the system thereof provided by the invention, the programming process is simplified, technical dependence on an operator is reduced and programming efficiency is improved greatly; moreover, in the invention, the token seed is transferred after encryption in process of communication between a programming device and a card or between a programming device and a token, which ensures security.

DETAILED DESCRIPTION OF THE INVENTION

Embodiments of the invention provide a seed programming method and a device thereof and are detailed in conjunction with the drawings as follows.

Embodiment 1

Embodiment 1 of the invention provides a contactless seed programming system. The system includes a contactless seed programming device and a dynamic token. The contactless manner refers to a manner of indirectly electrical connection, such as a connection based on radio frequency signal, infrared ray, bluetooth and NFC (Near Field Communication). The seed refers to a private key for generating a dynamic password by the token. The device is described as following in conjunction with FIG. 1.

Figure 1:
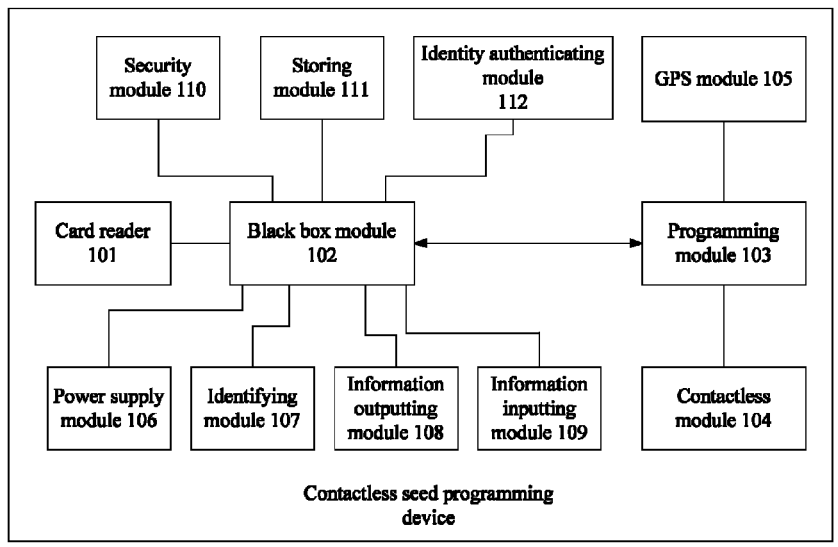
FIG. 1 is a diagram of a contactless seed programming device provided by Embodiment 1 of the invention.

As illustrated in FIG. 1, a contactless seed programming device includes a card reader 101, a black box module 102, a programming module 103, a contactless module 104, a GPS module 105, a power supply module 106, an identifying module 107, an information outputting module 108, an information inputting module 109, a security module 110, a storing module 111 and an identity authenticating module 112. The contactless module 104 and the GPS module 105 are separately connected with the programming module 103. The power supply module 106, the identifying module 107, the information outputting module 108 and the information inputting module 109, the security module 110, the storing module 111 and the identity authenticating module 112 are separately connected with the black box module 102. The black box module 102 is connected with the programming module 103. The card reader 101 is connected with the black box module 102. The contactless module 104 is connected with and communicated with the token. Functions of the above modules are discussed as follows.

The black box module 102 is configured to receive an instruction transferred by the programming module 103, perform corresponding operation according to the instruction and return response instruction; be connected with the power supply module; determine whether there is a token by scanning by the identifying module 107; perform security authentication by the identity authenticating module; obtain a seed by the card reader 101 and decrypt the seed by the security module 110; receive a random number transferred by the programming module 103; and encrypt the decrypted seed by the security module.

Serial communication interface between the black box module 102 and the identifying module 107 can be a USB interface, a serial interface, an eSATA interface, a 1394 interface and a PCI_E, interface etc.

The programming module 103 is configured to receive the instruction transferred by the black box module 102 and perform corresponding operation according to the instruction and return a response instruction; obtain GPS time and GPS status through the GPS module 105; be communicated with the token via the contactless module 104; obtain token information, where the token information includes type of the token, hardware information of the token and a random number corresponding to the token; send a seed programming instruction and performing seed programming on the token by the contactless module 104, and also may obtain the seed based on the couple to the card reader 101 and encrypt the seed.

The contactless module 104 is configured to connect with the programming module 103 and communicate with the token; obtain token information and program the seed, where the token information includes a type of the token, hardware information of the token and a random number corresponding to the token; and calibrate frequency of the token.

The GPS module 105 is configured to obtain GPS time and GPS status.

The power supply module 106 is configured to connect with the black box module 102 and supply power for the device.

The Identifying module 107 is configured to scan whether there is the token in a token slot, scan a barcode of the token and verify whether the seed is programmed successfully.

The information outputting module 108 is configured to receive and display the information transferred. The information outputting module 108 can be a LCD and a voice broadcaster, etc.

The information inputting module 109 is configured to receive operation information and transfer the operation information to the black box module 102, the inputting can be fulfilled by key(s), a PC keyboard and a touch screen, etc.

The security module 110 is configured to decrypt the obtained seed and encrypt the decrypted seed with the random number.

The storing module 111 is configured to record the status of the programmed seed and token ID (identity). The token ID includes a token barcode and a serial number of the token.

The identity authenticating module 112 is configured to perform security authentication on identity. The authentication can be USBKey authentication, user-input-password authentication and combination of the foresaid methods.

Moreover, a contactless seed programming device includes the card reader 101, the lack box module 102, the programming module 103, the contactless module 104, the GPS module 105, the power supply module 106, thye Identifying module 107, the information outputting module 108, the information inputting module 109, the security module 110, the storing module 111 and the identity authenticating module 112.

The contactless module 104, the GPS module 105, the power supply module 106, the information outputting module 108, the information inputting module 109, the security module 110 and the storing module 111 are separately connected with the programming module 103. The Identifying module 107 and the identity authenticating module 112 are separately connected with the black box module 102. The black box module 102 is connected with the programming module 103. The card reader 101 is connected with the programming module 103. The contactless module 104 is connected and communicated with the token.

It is noted that in a contactless seed programming device, a card reader 101, a power supply module 106, an information outputting module 108, an information inputting module 109, a security module 110 and a storing module 111 are separately connected with the black box module 102, or separately connected with the programming module 103, which both can realize the object of the invention.

Embodiment 2

In Embodiment 2 of the invention, an automatically-controlled contactless seed programming system is provided. The automatically-controlled contactless seed programming system is described in combination with FIG. 2 as below.

Figure 2:
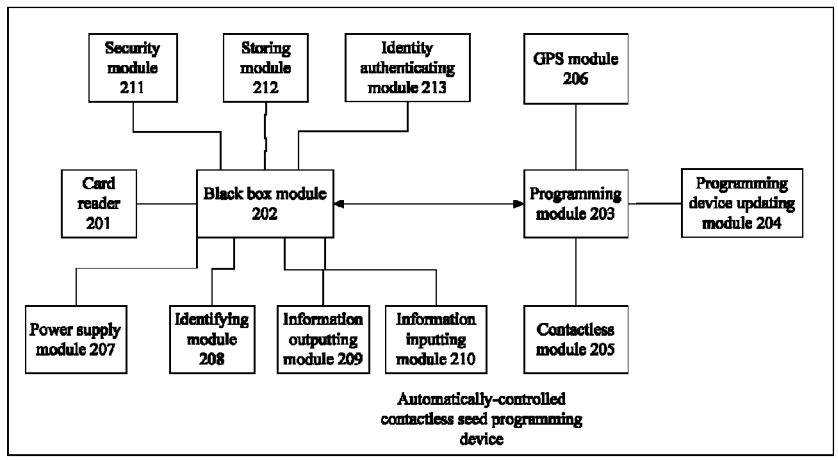
FIG. 2 is a diagram of an automatically-controlled contactless seed programming device provided by Embodiment 2 of the invention.

As illustrated in FIG. 2, the automatically-controlled contactless seed programming system includes a contactless seed programming device and a dynamic token. The device includes a card reader 201, a black box module 202, a programming module 203, a programming device updating module 204, a contactless module 205, a GPS module 206, a power supply module 207, an identifying module 208, an information outputting module 209, an information inputting module 210, a security module 211, a storing module 212 and an identity authenticating module 213.

The card reader 201, the power supply module 207, the identifying module 208, the information inputting module 209, the information inputting module 210, the security module 211, the storing module 212, the identity authenticating module 213 are separately connected with the black box module 202. The programming device updating module 204, the contactless module 205 and the GPS module 206 are separately connected with the programming module.

It is noted that the card reader 201, the programming device updating module 204, the power supply module 207, the storing module 212, and the identity authenticating module 213 can be connected with the black box module 202 or connected with the programming module 203.

Functions of the above modules are discussed as below.

The black box module 202 is configured to: receive instruction transferred by the programming module 203, perform operation(s) according to the instruction and return a response instruction; be connected with the power supply module 207; scan whether there is a token through the identifying module 208; perform security authentication through the identity authenticating module 213; obtain a seed through the card reader 201 and decrypt the seed with the security module 211; input information by the information inputting module 210; output information by the information outputting module 209; and also receive the random number transferred by the programming module 203 and encrypt the decrypted seed by the security module 211.

Serial communication interface between the black box module 202 and the identifying module 208 can be a USB interface, a serial interface, an eSATA interface, a 1394 interface and a PCI_E interface etc.

The programming module 203 is configured to receive instruction transferred by the black box module 202, perform corresponding operation according to the instruction and return a response instruction; obtain GPS time and GPS status by the GPS module 206; obtain token information by communicating with the token through the contactless module 205; send a seed programming instruction and perform seed programming on the token by the contactless module 205; automatically control the seed programming process by the programming device updating module 204, and also may obtain the seed based on connection with the card reader and encrypt the seed.

The programming device updating module 204 is configured to receive an operation requesting instruction sent by the programming module, process the operation instruction, execute the related operation and return an operation responding instruction to the programming module.

The contactless module 205 is configured to connect to the programming module 203 so as to communicate with the token; obtain the token information and program the seed, where the token information includes a type of the token, hardware information and a random number corresponding to the token; and calibrate frequency of the token.

The GPS module 206 is configured to obtain GPS time and a GPS status.

The power supply module 207 connected with the black box module 202 is configured to supply power to the device.

The identifying module 208 is configured to scan whether there is a token in a token slot, scan a barcode of the token and authenticate whether the seed is programmed successfully. The identifying module 208 can be an OCR (Optical Character Recognition) or a barcode scanner, etc.

The information outputting module 209 is configured to receive and display the information transferred. The information outputting module 209 can be a LCD or a voice broadcaster, etc.

The information inputting module 210 is configured to receive and transfer operational information to the black box module 202, and the inputting can be fulfilled by key(s), a PC keyboard, a touch screen etc.

The security module 211 is configured to decrypt the seed obtained and encrypt the decrypted seed with the random number.

The storing module 212 is configured to record status of the programming seed and the token ID. The token ID includes a token barcode and a serial number of the token.

The identity authenticating module 213 is configured to perform security authentication on identity. The authentication can be such as USBKey authentication, user-input-password authentication and combination of the foresaide methods.

Embodiment 3

Figure 3:
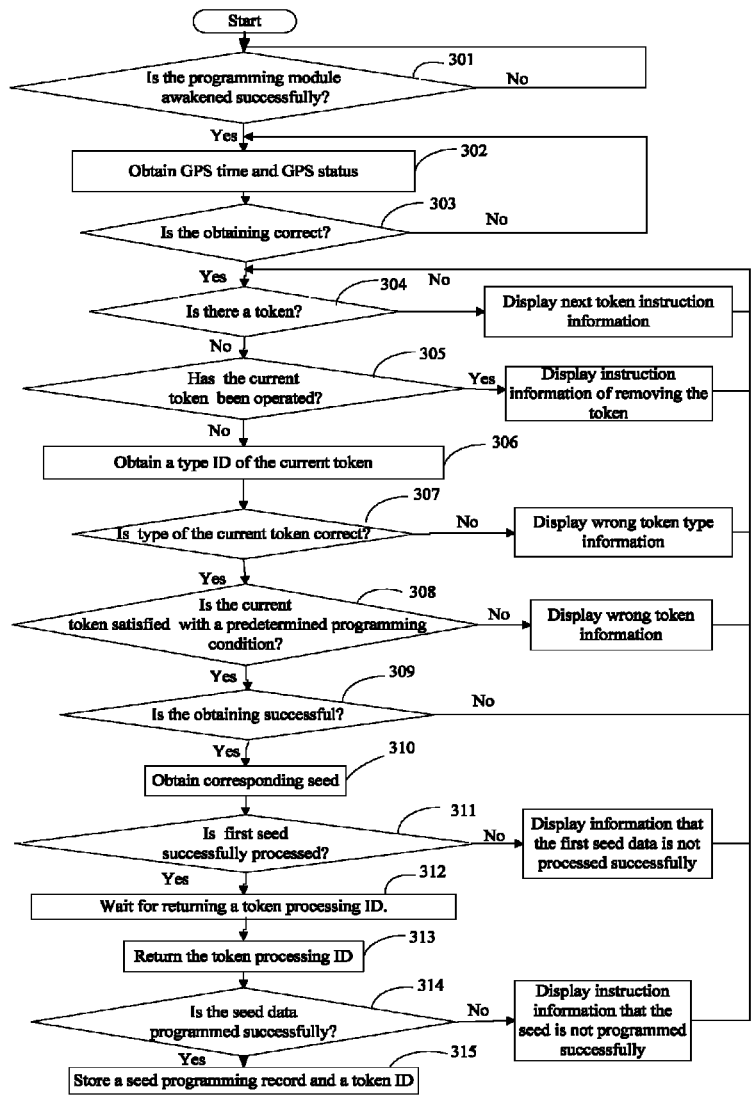
FIG. 3 is a flow chart of contactless seed programming method provided by Embodiment 3 of the invention.

In Embodiment 3 of the invention, a contactless seed programming method is provided. As illustrated in FIG. 3, the method includes the following steps.

Step 301, awakening a programming module of a contactless seed programming device and determining whether the awakening is successful according to an awakening responding instruction, if the awakening is successful, going to Step 302; otherwise, reawakening the programming module of the contactless seed programming device.

In the embodiment, if the awakening responding instruction is a first predetermined value, the programming module is awakened successfully; if the awakening responding instruction is not the first predetermined value, the programming module is not awakened successfully. For example, the first predetermined value is 0x00.

Step 302, obtaining GPS time and a GPS status.

Step 303, determining whether the obtained GPS time format and GPS status are correct, if yes, going to Step 304; otherwise, going to Step 302 and obtaining GPS time and GPS status again.

In the embodiment, the GPS status value can be a second predetermined value, a third predetermined value or a fourth predetermined value. If the GPS status value is the second predetermined value, it shows a successful status. For example, the second predetermined value is 0. If the GPS status value is the third predetermined value, it shows that something is wrong with an antenna. For example, the third predetermined value is 1. If the GPS status value is the fourth predetermined value, it shows that something is wrong with GPS. For example, the fourth predetermined value is 2.

Step 304, obtaining a token ID and determining whether there is a token in the token slot according to a return value of the token ID, if yes, going to Step 305; otherwise, displaying a prompt of placing next token information, and returning to Step 304 to continue obtaining the token ID.

In the embodiment, if the return value of the token ID is a fifth predetermined value, it shows that there is a token in the token slot. For example, the fifth predetermined value is 0x00.

The token ID can be obtained by the Identifying module. The token ID can be a token barcode and a serial number of the token. The token ID can be obtained by an OCR or a barcode scanner etc.

Step 305, determining whether current token has been operated according to a record in a first pre-storing unit, if yes, displaying information of a token removing instruction and returning to Step 304 to obtain the token ID again; otherwise going to Step 306.

Specifically, if the current token ID is identical to a programmed token ID in the first pre-storing unit, it shows that the current token has been operated; if the current token ID is not identical to the programmed token ID in the pre-storing unit, it shows that the current token has not been operated.

The record in the first pre-storing unit refers to the last programmed token ID.

Step 306, sending a communication instruction to the current token and obtaining type ID of the current token.

Specifically, in this embodiment, the communication instruction is sent to the token contactlessly.

Step 307, determining whether type of the current token is correct, if yes, going to Step 308; otherwise displaying instruction information indicating that the current token is abnormal and returning to Step 304 to obtain the token ID again.

In the embodiment, the communication instruction is sent to the current token by the contactless module and type of the token is determined by a value of the type ID of the token. For example, if the type ID of the token is a first type ID, it shows that type of the current token is a first token type; if the token ID of the token is a second type ID, it shows that type of the current token is a second token type.

Step 308, sending the token detecting instruction to the current token, obtaining information of the current token and determining whether the current token satisfies with a predetermined programming condition, if yes, going to Step 309;

otherwise, displaying information indicating that token information is wrong, returning to Step 304 to obtain the token ID again.

In the embodiment, the token detecting instruction is sent to the current token through the contactless module and the current token information includes detailed hardware information of the current token and first data corresponding to the current token. The first data is pre-stored data or a random number generated.

It is noted that in process of obtaining information of the current token of Step 308, the obtaining first data corresponding to the current token is a preferred step of the embodiment. Optionally, in other embodiments of the invention, the host may not obtain the first data corresponding to the current token, but directly obtain the token ID, obtain and program the corresponding seed according to the token ID.

Step 309, obtaining the current token ID and determining whether the obtaining is successful according to the current token ID, if yes, determining the obtaining is successful and going to Step 310; otherwise going back to Step 304.

Specifically, the step of obtaining the token ID and determining whether the token is obtained successfully according to the token ID is identical to that in Step 304 and so details of it are omitted herein.

Step 310, obtaining corresponding first seed data according to the current token ID.

In the embodiment, the seed data can be stored in a storing device such as a card, a U disk or a hardware etc. According to different storing devices of the seed data, the seed data can be obtained by reading the seed data by the card reader or obtaining the seed data via a USB interface or obtaining the seed data via an SATA interface.

Step 311, processing the first seed data and determining whether the first seed data is processed successfully, if yes, going to Step 312; otherwise displaying information of failing to process the first seed data and returning to Step 304.

Specifically, in this embodiment, the processing of the first seed data includes: decrypting the first seed data so as to obtain second seed data, and further includes encrypting the second seed data with the first seed data corresponding to the current token so as to obtain third seed data, and sending a seed programmable instruction to the programming device.

The programmed seed can be second seed data, or the programmed seed can be third seed data obtained by encrypting first data corresponding to the current token. The programming module receives the seed programmable instruction and determines whether the seed data is obtained and processed successfully according to ID of the seed programmable instruction, if ID of the seed programmable instruction is a sixth predetermined value, the seed data is obtained and processed successfully. For example, the sixth predetermined value is 0. If ID of the seed programmable instruction is not the sixth predetermined value, the seed data is not obtained and processed successfully.

Step 312, sending the operational data to the token and waiting for the token to return a token processing ID.

In this embodiment, the operational data includes a seed of the token and a GPS time factor.

The operational data is sent to the token by the contactless module.

Further, a contactless calibration process can be included before the operational data is sent to the token.

The contactless calibration process may be executed as follows: the programming module obtains frequency by the contactless module, obtains frequency of the current token by the contactless module; obtains frequency deviation value according to frequency obtained by GPS and frequency of the current token, and the programming module writes the frequency deviation value into the current token, the current token obtains time deviation value based on the frequency deviation value and calibrates frequency of the current token according to the time deviation value.

Step 313, processing, by the token, the operational data, updating the seed data of the token and time of the token, and returning the token processing ID to the contactless programming device.

Specifically, the step of processing the operational data by the token involves: the token parses the operational data so as to obtain third seed data and a time factor; decrypts the third seed data and the time factor so as to obtain second seed data and time factor; encrypts the second seed data and the time factor with information inside the token separately so as to obtain fourth seed data and a time factor. The updating of the seed data and time of the token includes: storing the fourth seed data and the time factor in a second storing unit and replacing content in the second pre-storing unit with them.

It is noted that in this embodiment, after the token obtains the third seed data, the method may further include a process of determining whether the second seed data is valid. The determining whether the second seed data is valid includes:

reading a value of the ID bit from a predetermined position of the second seed data; and determining whether the value of the ID bit is identical to a value pre-stored in the token, if yes, determining that the second seed data is valid; otherwise, determining that the second seed data is invalid and returning information of invalid seed data to the programming device.

Step 314, receiving the token processing ID and determining whether the seed data is programmed successfully according to value of the token processing ID, if yes, display instruction that the seed is programmed successfully and going to Step 315; otherwise, display instruction that the seed is not programmed successfully and going to Step 304.

In the embodiment, if the token processing ID is a seventh predetermined value, it shows that the seed is programmed successfully; otherwise, it shows that the seed is not programmed successfully. The seventh predetermined value is 0.

It is noted that the method may further include a process of OCR authentication after the seed is programmed.

The process of OCR authentication may include: obtaining a barcode of the current token and a password of the current token by the OCR module and obtaining a seed of the current token from the card reader according to a barcode of the current token, decrypting the seed of the current token, processing the decrypted seed so as to compute a token password and determining whether the token password obtained by the OCR module is identical to the computed token password, if yes, determining that the authentication is passed and the seed is programmed successfully; otherwise determining that the authentication is not passed and the seed is not programmed successfully.

Step 315, storing a record indicating the seed is programmed successfully and the token ID into the pre-storing unit.

The storing of the token ID can be done before programming the seed or in the process of obtaining the programmed seed.

It is noted that in other embodiments of the invention, the object of the invention can also be achieved by the above implements.

Embodiment 4

Figure 4:
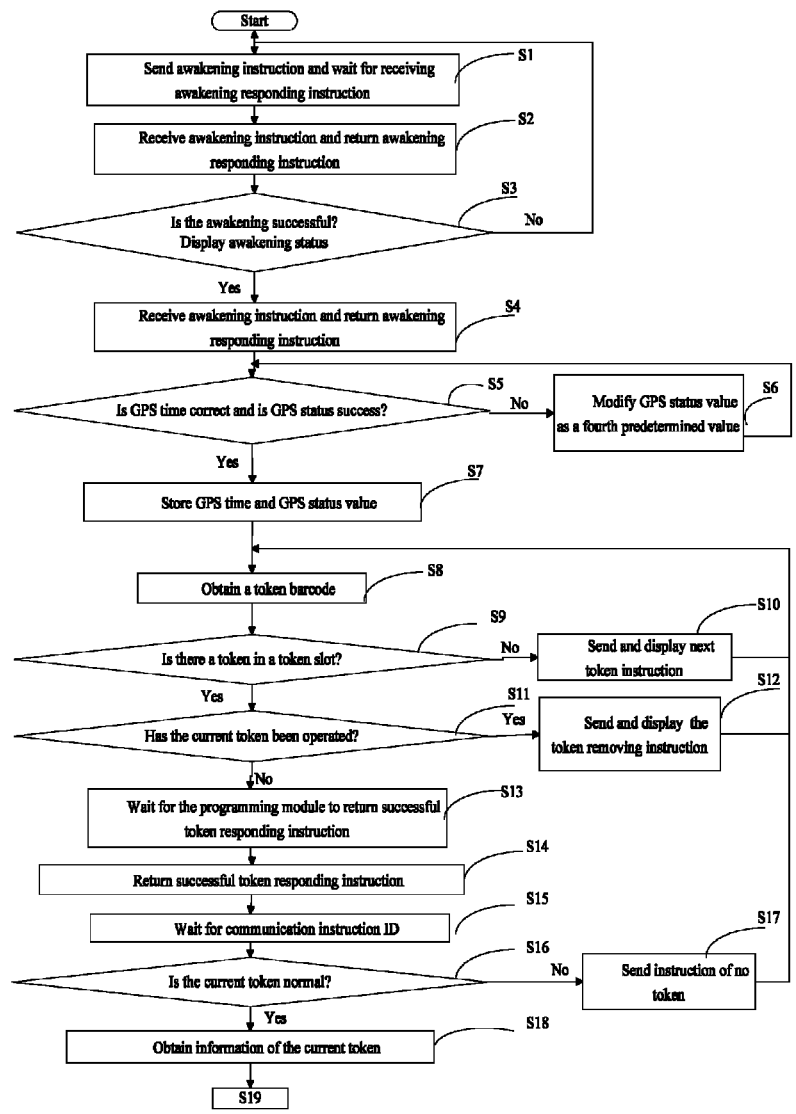
FIG. 4 and FIG. 5 are detailed flow charts of contactless seed programming method provided by Embodiment 4 of the invention.
Figure 5:
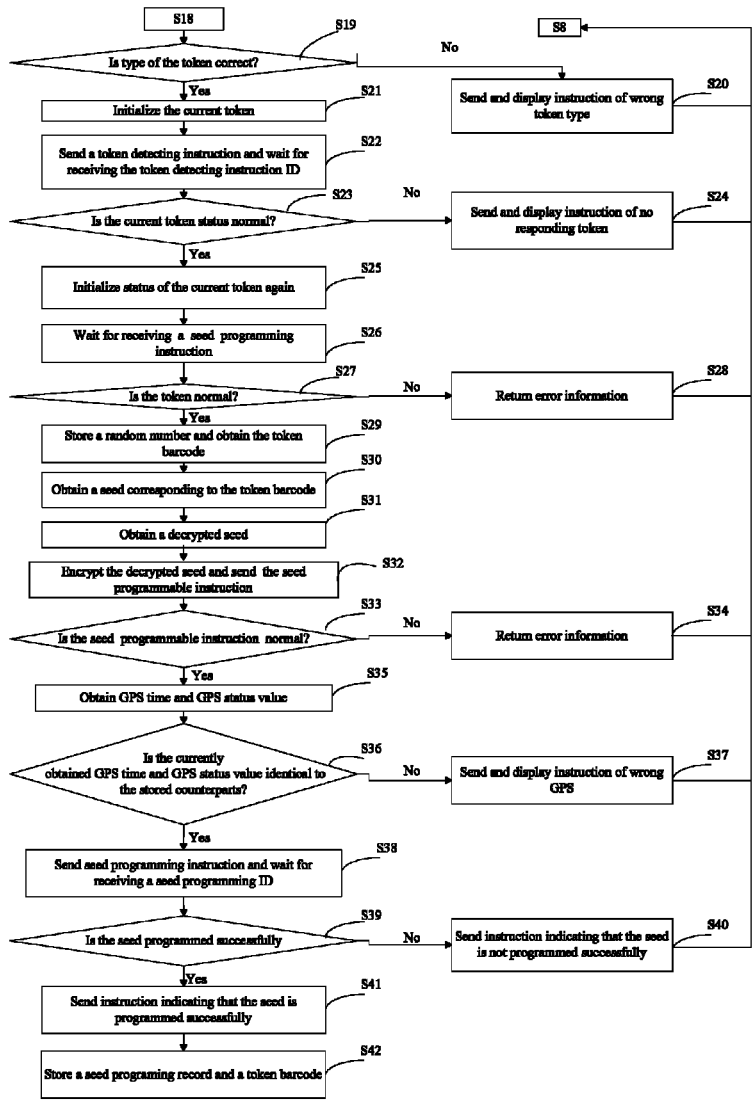

In embodiment 4 of the invention, a contactless seed programming method is disclosed. The method, as illustrated in FIG. 4 and FIG. 5, includes steps as below.

Step S1, the black box module sends an awakening instruction to the programming module and waits for receiving an awakening responding instruction.

For example, the awakening instruction is 4900.

Step S2, the programming module receives the awakening instruction and returns the awakening responding instruction to the black box module.

Step S3, the black box module receives the awakening responding instruction and determines whether the programming module is awakened successfully according to a value of the awakening responding instruction and displays awakening status by the information outputting module, if the programming module is awakened successfully, go to Step S4; otherwise, return to Step S1 to send the awakening instruction again.

In the embodiment, if the awakening responding instruction is a first predetermined value, the programming module is awakened successfully. For example, the first predetermined value is 0X00. If the awakening responding instruction is not the first predetermined value, the programming module is not awakened successfully.

Step S4, the programming module obtains GPS time and GPS status value.

In the embodiment, the programming module obtains the GPS time and GPS status value by the GPS module. Specifically, the GPS status value includes a second predetermined value, a third predetermined value and a fourth predetermined value. If the GPS status value is the second predetermined value, it shows a successful status. The second predetermined value is x00. If the GPS status value is the third predetermined value, it shows that something is wrong with the antenna. The third predetermined value is 0x01. If the GPS status value is the fourth predetermined value, it shows that something is wrong with GPS. The fourth predetermined value is 0x02.

Step S5, the programming module determines whether the GPS time is correct and the GPS status is success according to the obtained GPS time and the GPS status value, if the GPS time is correct and the GPS status is success, Step S7 is executed; otherwise, Step S6 is executed.

Specifically in the embodiment, if the GPS status value is the second predetermined value, the GPS status is obtained successfully.

Step S6, modify the GPS status value in the GPS module as the fourth predetermined value and return to Step S5 to obtain the GPS time and the GPS status value again.

Step S7, the programming module stores the GPS time and the GPS status value.

Step S8, the black box module obtains the token barcode.

In this embodiment, the black box module obtains the token barcode by the identifying module. Specifically the token barcode can be obtained by an OCR or a barcode scanner.

Step S9, the black box module determines whether there is a token in the token slot according to the token ID, if yes, Step S11 is executed; otherwise, Step S10 is executed.

If there is a token barcode value in a barcode storage area and barcode ID of the token is a fifth predetermined value, there is a token in the token slot; if there is no token barcode value in the barcode slot or the barcode ID of the token is not the fifth predetermined value, there is no token in the token slot and the token is not obtained successfully. For example, the fifth predetermined value is 0x00.

Step S10, the black box module sends a next token instruction, displays the next token instruction by the information outputting module, and returns Step S8.

Step S11, the black box module determines whether the current token has been operated, if yes, Step S12 is executed; otherwise, Step S13 is executed.

Specifically, whether the current token has been operated is determined by the black box module according to whether the current token barcode is identical to barcode of the last programmed token.

Step S12, the black box module sends a token removing instruction, displays the removing instruction by the information outputting module, and returns to Step S8.

Step S13, the black box module sends an instruction indicating the token is successfully obtained to the programming module and waits for the programming module to return an instruction indicating that the token successfully responses.

Step S14, the programming module receives the instruction indicating that the token successfully responses and returns the instruction indicating that the token successfully responses to the black box module.

Step S15, the programming module sends a communication instruction to the token by the contactless module and waits for the communication instruction ID.

Specifically, the communication instruction is 10, which includes type of the token.

Step S16, the programming module receives the communication instruction ID and determines whether the current token is normal according to the communication instruction ID, if yes, Step S18 is executed; otherwise, Step S17 is executed.

Specifically, if the communication instruction ID is a sixth predetermined value, the token is normal. Specifically, the sixth predetermined value is 0. If the communication instruction ID is not the sixth predetermined value, the token is abnormal.

Step S17, the programming module sends instruction of abnormal token and returns to Step S8.

Step S18, the programming module communicates with the token via the contactless module and obtains token information.

The token information includes type of the token, hardware information of the token and a random number of the token.

Step S19, the programming module determines whether type of the token is correct according to the token type ID (identification), if yes, Step S21 is executed; otherwise Step S20 is executed.

Step S20, the programming module sends instruction of wrong token type, displays the instruction of wrong token type by the information outputting module, and returns to S8.

Step S21, the programming module initializes the current token by the contactless module.

The status after the current token is initialized is set to be initial status.

Step S22, the programming module sends token detecting instruction to the token through the contactless module and waits for receiving the token detecting instruction ID.

Step S23, the programming module receives the token detecting instruction ID and determines whether status of the current token is normal according to the token detecting instruction ID, if yes, Step S25 is executed; otherwise, Step S24 is executed.

If the token detecting instruction ID is a seventh predetermined value, status of the token is normal; if the token detecting instruction ID is not the seventh predetermined value, status of the token is abnormal. For example, the seventh predetermined value is 0.

Step S24, the programming module sends instruction indicating that the token does not response, displays the instruction indicating that the token does not response by the information outputting module, and returns to Step S8.

Step S25, the programming module initializes status of the current token again through the contactless module.

Step S26, the programming module sends a seed programming instruction to the black box module and waits for receiving a seed programmable instruction.

Step S27, the black box module receives the seed programming instruction and determines whether the current token is normal according to seed programming instruction ID, if yes, goes to Step S29; otherwise, goes to Step S28.

If the seed programming instruction ID is an eighth predetermined value, the seed programming instruction is normal; if the seed programming instruction ID is not the eighth predetermined value, the seed programming instruction is abnormal.

Step S28, the black box module returns error information and goes to Step S8.

Step S29, the black box module stores the random number and obtains a token barcode through the OCR module. Step S30, the black box module obtains a seed corresponding to the token barcode through the card reader.

Step S31, the black box module decrypts the seed so as to obtain a decrypted seed.

Step S32, the black box module uses the random number to encrypt the decrypted seed and sends the seed programmable instruction to the programming module.

Step S33, the programming module receives the seed programmable instruction and determines whether the seed programmable instruction is normal according to seed programmable instruction ID, if yes, goes to Step S35; otherwise, goes to Step S34.

If the seed programmable instruction ID is a ninth predetermined value, the seed programmable instruction is normal; if the seed programmable instruction ID is not the ninth predetermined value, the seed programmable instruction is abnormal. For example, the ninth predetermined value is 0.

Step S34, the programming module returns error information and returns to Step S4.

Step S35, the programming module obtains GPS time and a GPS status value.

Step S36, the programming module determines whether the currently obtained GPS time and GPS status value are identical to the stored GPS time and the GPS status value, if yes, goes to Step S38; otherwise, goes to Step S37.

Step S37, the programming module sends a wrong GPS instruction, displays the wrong GPS instruction by the information outputting module, and returns to Step S8.

Step S38, the programming module sends seed programming instruction to the token by the contactless module and waits for receiving a seed programming ID.

Step S39, the programming module receives the seed programming ID and determines whether the seed programming is successful according to the seed programming ID, if yes, goes to Step S41; otherwise, goes to Step S40.

Step S40, the programming module sends instruction indicating that the seed is not programmed successfully and returns to Step S8.

Step S41, the programming module sends instruction indicating that the seed is programmed successfully.

Step S42, a seed programming record and the current token barcode are stored.

Embodiment 5

Figure 6:
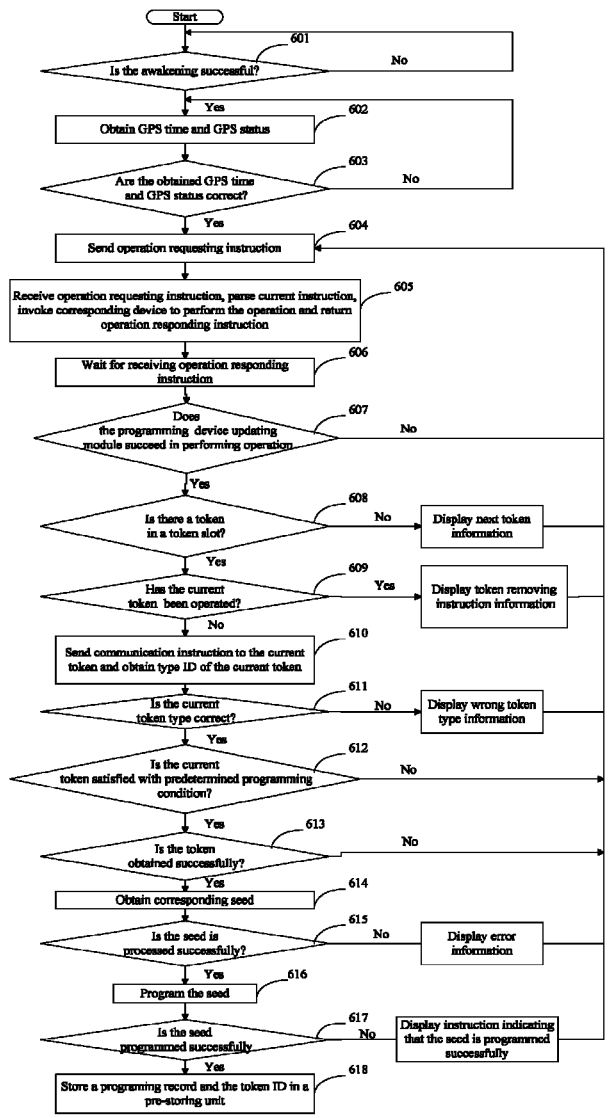
FIG. 6 is a flow chart of automatically-controlled contactless seed programming method provided by Embodiment 5 of the invention.

In embodiment 5 of the invention, an automatically-controlled contactless seed programming method is provided. As illustrated in FIG. 6, the method includes the following steps.

Step 601, awakening a programming module of a contactless seed programming device and determining whether the programming module is awakened successfully according to an awakening responding instruction, if the programming module is awakened successfully, going to Step 602; otherwise, awakening the programming module of the contactless seed programming device again.

In the embodiment, if the awakening responding instruction is a first predetermined value, the programming module is awakened successfully; if the awakening responding instruction is not the first predetermined value, the programming module is not awakened successfully. For example, the first predetermined value is 0x00.

Step 602, obtaining GPS time and a GPS status.

Step 603, determining whether the obtained GPS time and GPS status are correct, if yes, going to Step 604; otherwise, returning to Step 602 and obtains GPS time and GPS status again.

In the embodiment, value of the GPS status includes a second predetermined value, a third predetermined value or a fourth predetermined value. If value of the GPS status is the second predetermined value, the status is success. For example, the second predetermined value is 0. If value of the GPS status is the third predetermined value, something is wrong with an antenna. For example, the third predetermined value is 1. If value of the GPS status is the fourth predetermined value, something is wrong with the GPS. For example, the fourth predetermined value is 2.

Step 604, sending an operation requesting instruction to the programming device updating module.

Step 605, the programming device updating module receives the operation requesting instruction, parseing the current instruction and invoking a relating device to perform corresponding operation, and returning an operation responding instruction.

Step 606, waiting for, by the programming module, receiving the operation responding instruction.

In the embodiment, the programming module waits for receiving the operation responding instruction and the waiting can be ended by a timer interruption method, and the time interruption method is executed as: waiting for the receiving operation responding instruction after sending the operation requesting instruction, setting predetermined time of the timer and counting down, if the timer counts 0, triggering an interruption, returns to Step S604 to resend the operation requesting instruction.

Step 607, receiving, by the programming module, the operation responding instruction and determining whether the programming device updating module executes the operation successfully according to the operation responding instruction, if yes, going to Step 608; otherwise, going to Step 604.

Step 608, obtaining a token ID and determining whether there is a token in the token slot according to the token ID, if yes, going to Step 609; otherwise, displaying next token information and returning to Step 604.

In the embodiment, if a return value of the token ID is a fifth predetermined value, there is a token in the token slot. For example, the fifth predetermined value is 0x00.

The token ID is obtained by the identifying module. The token ID can be a token barcode or a serial number of the token etc. The token ID can be obtained by an OCR, a barcode scanner etc.

Step 609, determine whether the current token has been operated, if yes, display instruction information of removing the token and return to Step 604; otherwise, go to Step 610.

Specifically, the current token has been operated or not is determined according to the current token ID and a programmed token ID in the pre-storing unit, if the current token ID is identical to the programmed token ID in the pre-storing unit, the current token has been operated; if the current token ID is different from the programmed token ID in the pre-storing unit, the current token has not been operated.

A last programmed token ID is stored in the pre-storing unit.

Step 610, sending a communication instruction to the current token and obtaining a type ID of the current token.

In the embodiment, the communication instruction is sent to the current token through the contactless module and type of the token is determined according to value of the type ID of the token. For example, if the type ID of the token is a first type ID, type of the current token is a first token type; if the type ID of the token is a second type ID, type of the current token is a second token type.

Step 611, determining whether type of the current token is correct, if yes, going to Step 612; otherwise, displaying information indicating that the current token type is wrong and returning to Step 604.

Step 612, sending a token detecting instruction to the current token, obtaining the current token information and determining whether the current token is satisfied with a predetermined programming condition, if yes, going to Step 613, otherwise, returning to Step 604.

In the embodiment, the token detecting instruction is sent to the current token through the contactless module and the current token information includes detailed hardware information of the current token and a random number corresponding to the current token.

It is noted that the step of obtaining a random number corresponding to the current token in Step 408 is a preferred step of the embodiment, and in other embodiments, the host may not obtain the random number corresponding to the current token, but directly obtain the token ID, obtain a corresponding seed according to the token ID and program the seed.

Step 613, obtaining the current token ID and determining whether the token is obtained successfully according to the current token ID, if yes, going to Step 614; otherwise, returning to Step 608.

Specifically, the particular process of obtaining the current token ID and determining whether the token is obtained successfully according to the current token ID is the same with that in Step 604, and thus details are omitted herein.

Step 614, obtaining a corresponding seed according to the current token barcode.

In the embodiment, the seed can be stored in a storing device such as a card, a U disk and a hardware etc. For different storing devices, the seed can be obtained by methods such as obtaining the seed by a card reader or by a USB interface or by an SATA interface.

Step 615, processing the seed and determining whether the seed is processed successfully, if yes, going to Step 616; otherwise, displaying error information and returning to Step 604.

Specifically, the step of processing the seed includes: decrypting the seed, and further the step may include: encrypting the decrypted seed according to the random number corresponding to the current token and sending a seed programmable instruction to the programming module.

A programmable seed can be plain text of the decrypted seed, or the programmable seed may be cipher text of encrypting the decrypted seed with the random number corresponding to the current token. The programming module receives the seed programmable instruction and determines whether the seed is obtained and processed successfully according to ID of the seed programmable instruction, if the ID of the seed programmable instruction is a sixth predetermined value, the seed is obtained and processed successfully. For example, the sixth predetermined value is 0. If the ID of the seed programmable instruction is not the sixth predetermined value, the seed is not obtained and processed successfully.

Step 616, programming the seed.

Specifically, a seed programming instruction is sent to the token through the contactless module to program the seed.

Further, a contactless calibration process can be included before programming the seed.

The contactless calibration process may be fulfilled as: the programming module obtains frequency through the contactless module and obtains frequency of the current token by the contactless module, obtains a frequency deviation value according to frequency obtained by the GPS and frequency of the current token and the programming module writes the frequency deviation value into the current token and the current token calibrates frequency of itself according to the frequency deviation value.

Step 617, determining whether the seed is programmed successfully, if yes, displaying an instruction indicating that the seed is programmed successfully and going to Step 618; otherwise, displaying an instruction indicating that the seed is not programmed successfully and returning to Step 604.

In the embodiment, the method of determining whether the seed is programmed successfully includes: determining by seed programming ID and if the seed programming ID is a seventh predetermined value, the seed is programmed successfully; otherwise, the seed is not programmed successfully. For example, the seventh predetermined value is 0.

It is noted that an OCR authentication process can be included after the seed is programmed.

The OCR authentication process may be fulfilled as: obtaining a barcode of the current token and a password of the current token by the OCR module, obtaining a seed of the current token from the card reader according to barcode of the current token, decrypting the seed of the current token, processing the decrypted seed and computing the password of the token, determining whether the obtained token password is identical to the computed token password by the OCR module, if yes, determining the authentication is passed and the seed is programmed successfully; otherwise, determining the authentication is not passed and the seed is not programmed successfully.

Step 618, storing a programming record and a token ID into a pre-storing unit.

The storing of the token barcode can be done before programming the seed or in the process of obtaining the seed.

It is noted that the step of obtaining GPS time and GPS status can be executed at any step after awakening the contactless seed programming device in other embodiments of the invention; and the step of communicating with the current token and obtaining the current token information can be executed at any step before obtaining the seed. The above embodiments can also achieve the purpose of the invention.

Embodiment 6

A contactless seed programming system including a programming device and a dynamic token is disclosed.

The programming device includes modules as below.

A first obtaining module is configured to obtain a token ID of the dynamic token. Specifically the first obtaining module is configured to: obtain the token ID of the dynamic token in case that the dynamic token is satisfied with a programming condition, where the token ID can be obtained by an OCR (optical character recognition) or a barcode scanner; further obtain the token ID again in case that the first determining module determines that there is no dynamic token in a token slot; obtain the token ID again in case that the dynamic token is not satisfied with the programming condition; and obtain the token ID again in case that a fourth determining module determines that the token ID is included in a pre-storing unit.

A second obtaining module is configured to obtain first seed data according to the token ID. Specifically, the second obtaining module is configured to: obtain corresponding first seed data according to the token ID in case that the programming device determines that there is a dynamic token in the token slot according to a return value of the token ID obtained; and obtain first seed data corresponding to the token ID through a card reader, a USB interface or an SATA interface.

A third obtaining module is configured to communicate with the dynamic token contactlessly and obtain the first seed data from the dynamic token.

A first decrypting module is configured to decrypt the first seed data so as to obtain second seed data.

An encrypting module is configured to encrypt the second seed data with first data so as to obtain third seed data.

A sending module is configured to send the third seed data to the dynamic token contactlessly.

Further the programming device may include the following modules.

A fourth obtaining module is configured to communicate with a standard time device and obtain GPS time information from the standard time device.

The encrypting module is further configured to encrypt the GPS time according to the first data.

The sending module is further configured to send the encrypted GPS time to the dynamic token contactlessly.

The second decrypting module is further configured to decrypt the received GPS time according to the first data stored in the dynamic token.

A fifth obtaining module is configured to obtain GPS status.

A second displaying module is configured to display the GPS status.

A sixth obtaining module is configured to obtain a return value of the token ID.

A first determining module is configured to determine whether there is a dynamic token in the token slot according to the return value of the token ID.

A seventh obtaining module is configured to send a token detecting instruction to the dynamic token and obtain token information.

A second determining module is configured to determine whether the dynamic token is satisfied with a programming condition according to the token information.

An eighth obtaining module is configured to obtain pulse frequency and frequency of the dynamic token.

A writing module is configured to write a frequency deviation value between the pulse frequency and frequency of the dynamic token into the dynamic token.

A ninth obtaining module is configured to obtain the token ID and the token password of the dynamic token and obtain corresponding first seed data according to the token ID.

A computing module is configured to compute the token password according to the second seed data.

A third determining module is configured to determine whether the computed token password is identical to the obtained token password, if yes, the seed is programmed successfully; otherwise, the seed is not programmed successfully.

A second receiving module is configured to receive a token processing ID from the dynamic token and determine that the seed is programmed successfully in case that value of the token processing ID is a seventh predetermined value.

A storing module is configured to store a programming record and the token ID in the pre-storing unit after determining that the seed is programmed successfully.

The second obtaining module is configured to obtain corresponding first seed data according to the token ID in case that the token ID is not included in the pre-storing unit.

A fourth determining module is configured to determine whether the token ID is included in the pre-storing unit.

The dynamic token includes the following modules.

A first receiving module is configured to receive the third seed data from the programming device contactlessly.

A second decrypting module is configured to decrypt the third seed data according to the first data stored in the dynamic token so as to obtain the second seed data.

An updating module is configured to update seed data stored in the dynamic token according to the second seed data. Specifically, the updating module is configured to: update seed data stored in the dynamic token according to the second seed data in case that the second seed data is valid; process the second seed data and update the seed data stored by itself with the processed seed data; and update GPS time of the dynamic token as the decrypted GPS time.

Further the dynamic token may include the following modules.

A determining module is configured to determine whether the second seed data is valid.

Specifically determining module is configured to read a value of a flag bit from a predetermined position of the second seed data and determine whether the value of the read value of the flag bit is identical to the predetermined value stored in the dynamic token, if yes, determine that the second seed data is valid; otherwise, determine that the second seed data is invalid.

A first displaying module is configured to display error information in case that the determining module determines that the second seed data is invalid.

The dynamic token further includes the following module.

A calibrating module is configured to calibrate frequency of itself according to the frequency deviation value.

The above-mentioned are just preferred embodiments of the invention, not a limit to scope of protection of the invention, and any change or substitute made by a person skill in the art in technology scope of the invention should fall within the scope of protection of the invention. Therefore, the scope of protection of the invention should be based on the appended claims.

What is claimed is:

1. A seed programming method, comprising:
obtaining, by a programming device, a token ID of a dynamic token;
obtaining, by the programming device, first seed data according to the token ID, connecting and communicating with the dynamic token contactlessly, and obtaining first data from the dynamic token;
decrypting, by the programming device, the first seed data so as to obtain second seed data and encrypting the second seed data according to the first seed data so as to obtain third seed data;
sending, by the programming device, the third seed data to the dynamic token contactlessly; and
decrypting, by the dynamic token, the third seed data according to the first seed data stored in the dynamic token so as to obtain the second seed data and updating the seed data stored in the dynamic token according to the second seed data.

2. The method of claim 1, wherein the step of updating, the seed data stored in the dynamic token according to the second seed data comprises:

updating, by the dynamic token, the seed data stored in the dynamic token according to the second seed data in case that the dynamic token determines that the second seed data is valid;

and before the step of updating the seed data stored in the dynamic token according to the second seed data, the method further comprises:

determining, by the dynamic token, whether the second seed data is valid;

and the step of determining, by the dynamic token, whether the second seed data is valid comprises:

reading, by the dynamic token, a value of a flag bit in a predetermined position from the second seed data and determining whether the read value of the flag bit is identical to a predetermined value stored in the dynamic token, if yes, determining that the second seed data is valid; otherwise, determining that the second seed data is invalid.

3. The method of claim 1, wherein the step of updating the seed data stored in the dynamic token according to the second seed data comprises:

processing, by the dynamic token, the second seed data and updating the seed data stored in the dynamic token according to the processed seed data.

4. The method of claim 1, wherein, after the step of obtaining, by the programming device, first data corresponding to the dynamic token from the dynamic token, the method further comprises:

connecting and communicating, by the programming device, with a standard time device and obtaining GPS time information from the standard time device, encrypting the GPS time information according to the first data and sending the encrypted GPS time information to the dynamic token contactlessly; and decrypting, by the dynamic token, the received GPS time information according to the first data stored in the dynamic token and updating the GPS time information of the dynamic token to be decrypted GPS time information.

5. The method of claim 1, wherein the step of obtaining, by the programming device, the first seed data according to the token ID comprises:

obtaining, by the programming device, first seed data according to the token ID in case that the programming device determines that there is a dynamic token in a token slot according to a return value of the obtained token ID;

and before the step of obtaining, by the programming device, first seed data according to the token ID, the method further comprises;

obtaining, by the programming device, the return value of the token ID and determining whether there is a dynamic token in the token slot according to the return value of the token ID;

and after the step of determining, by the programming device, whether there is a dynamic token in the token slot according to the return value of the token ID, the method further comprises:

obtaining, by the programming device, the token ID again, in case that the programming device determines that there is no dynamic token in the token slot according to the return value of the obtained token ID.

6. The method of claim 1, wherein the step of obtaining, by the programming device, first seed data according to the token ID comprises:

obtaining, by the programming device, the token ID of the dynamic token, when the programming device determines that the dynamic token is satisfied with a programming condition according to token information of the obtained dynamic token;

and before the step of obtaining, by the programming device, the token ID of the dynamic token, the method further comprises:

sending, by the programming device, a token detecting instruction to the dynamic token, obtaining the token information and determining whether the dynamic token is satisfied with the programming condition according to the token information;

and after the step of determining, by the programming device, whether the dynamic token is satisfied with the programming condition according to the token information, the method further comprises:

obtaining, by the programming device, the token ID again in case that the programming device determines that the dynamic token is not satisfied with the programming condition according to the token information.

7. The method of claim 1, wherein, before the step of sending, by the programming device, the third seed data to the dynamic token contactlessly, the method further comprises:

obtaining, by the programming device, a pulse frequency and frequency of the dynamic token and writing a frequency deviation value between the pulse frequency and frequency of the dynamic token into the dynamic token; and calibrating, by the dynamic token, frequency of the dynamic token according to the frequency deviation value.

8. The method of claim 1, wherein, after the step of sending, by the programming device, the third seed data to the dynamic token contactlessly, the method further comprises:

obtaining, by the programming device, the token ID and a token password of the dynamic token and obtaining corresponding first seed data according to the token ID;

decrypting, the programming device, the first seed data so as to obtain second seed data and computing the token password according to the second seed data; and determining, by the programming device, whether the computed token password is identical to the obtained token password, if yes, determining that the seed is programmed successfully; otherwise, determining that the seed is not programmed successfully; or after the step of sending, by the programming device, the third seed data to the dynamic token contactlessly, the method further comprises:

receiving, by the programming device, a token processing ID from the dynamic token and determining that the seed is programmed successfully in case that value of the token ID is a seventh predetermined value.

9. The method of claim 8, wherein after the step of determining, by the programming device, that the seed is programmed successfully, the method further comprises;

storing, by the programming device, a programming record and the token ID in a pre-storing unit;

and the step of obtaining, by the programming device, first seed data according to the token ID comprises:

obtaining, by the programming device, first seed data according to the token ID after determining that the token ID is not included in the pre-storing unit;

and before the step of obtaining, by the programming device, first seed data according to the token ID, the method further comprises:

determining, by the programming device, whether the token ID is included in the pre-storing unit;

and after the step of determining, by the programming device, whether the token ID is included in the pre-storing unit, the method further comprises:

obtaining, by the programming device, the token ID again after determining that the token ID is included in the pre-storing unit.

10. The method of claim 1, wherein step of obtaining, by the programming device, first seed data according to the token ID comprises:

obtaining, by the programming device, first seed data corresponding to the token ID through a card reader, a USB interface or an SATA interface.

11. A seed programming system, comprising a programming device and a dynamic token, wherein the programming device comprises:

a first obtaining module a token ID of the dynamic token;

a second obtaining module obtaining corresponding first seed data according to the token ID;

a third obtaining module connecting and communicating with the dynamic token contactlessly and obtain first data from the dynamic token;

a first decrypting module decrypting the first seed data so as to obtain second seed data;

an encrypting module encrypting the second seed data according to the first data so as to obtain the third seed data; and a sending module sending the third seed data to the dynamic token contactlessly; and the dynamic token comprises:

a first receiving module receiving the third seed data from the programming device contactlessly;

a second decrypting module decrypting the third seed data according to the first data stored in the dynamic token so as to obtain the second seed data; and an updating module updating seed data stored in the dynamic token according to the second seed data.

12. The system of claim 11, wherein the updating module updates seed data stored in the dynamic token according to the second seed data in case that the second seed data is valid; and the dynamic token further comprises a determining module determining whether the second seed data is valid, where the determining module reads a value of a flag bit in a predetermined position from the second seed data and determines whether the read value of the flag bit is identical to a predetermined value stored in the dynamic token, if yes, determines that the second seed data is valid; otherwise, determines that the second seed data is invalid.

13. The system of claim 11, wherein the updating module processes the second seed data and updates the seed data stored in the dynamic token with the processed seed data.

14. The system of claim 11, wherein the programming device further comprises a fourth obtaining module connecting and communicating with a standard time device and obtain GPS time information from the standard time device;

wherein the encrypting module further encrypts the GPS time information according to the first data;

the sending module further sends the encrypted GPS time information to the dynamic token contactlessly;

the second decrypting module further decrypts the received GPS time information according to the first data stored in the dynamic token; and the updating module further updates the GPS time information of the dynamic token to be decrypted GPS time information;

and the programming device further comprises a fifth obtaining module obtaining GPS status and a second displaying module displaying the GPS status.

15. The system of claim 11, wherein the second obtaining module obtains corresponding first seed data according to a token ID after determining that there is a dynamic token in a token slot according to a return value of the token ID obtained by the programming device;

and the programming device further comprises a sixth obtaining module obtaining the return value of the token ID;

a first determining module determining whether there is a dynamic token in the token slot according to the return value of the token ID; and the first obtaining module further obtains the token ID again in case that the first determining module determines that there is no dynamic token in the token slot.

16. The system of claim 11, wherein the first obtaining module obtains the token ID of the dynamic token in case that the dynamic token is satisfied with a programming condition;

and the programming device further comprises a seventh obtaining module sending token detecting instruction to the dynamic token and obtaining token information; and a second determining module determining whether the dynamic token is satisfied with a programming condition according to the token information; and the first obtaining module further obtains the token ID again in case that the dynamic token is not satisfied with the programming condition.

17. The system of claim 11, wherein the programming device comprises an eighth obtaining module obtaining a pulse frequency and frequency of the dynamic token; and a writing module writing a frequency deviation value between the pulse frequency and frequency of the dynamic token into the dynamic token;

and the dynamic token further comprises a calibrating module calibrating frequency of the dynamic token according to the frequency deviation value.

18. The system of claim 11, wherein the programming device comprises a ninth obtaining module obtaining the token ID of the dynamic token and a token password of the dynamic token and obtaining corresponding first seed data according to the token ID;

a computing module computing the token password according to the second seed data; and a third determining module determining whether the computed token password is identical to the obtained token password, if yes, determining that the seed is programmed successfully; otherwise, determining that the seed is not programmed successfully; or the programming device further comprise a second receiving module receiving a token processing ID from the dynamic token and determining that the seed is programmed successfully in case that value of the token processing ID is a seventh predetermined value.

19. The system of claim 18, wherein the programming device further comprises a storing module storing a programming record and the token ID into a pre-storing unit after determining that the seed is programmed successfully;

and the second obtaining module obtains corresponding first seed data according to the token ID in case that the token ID is not included in the pre-storing unit;

and the programming device further comprises a fourth determining module determining whether the token ID is included in the pre-storing unit; and the first obtaining module further obtains the token ID again in case that the fourth determining module determines that the token ID is included in the pre-storing unit.

20. The system of claim 11, wherein the second obtaining module obtains the first seed data corresponding to the token ID through a card reader, a USB interface or an SATA interface.

* * * * *

UNITED STATES PATENT AND TRADEMARK OFFICE
CERTIFICATE OF CORRECTION

PATENT NO. : 8,996,872 B2
APPLICATION NO. : 14/116379
DATED : March 31, 2015
INVENTOR(S) : Zhou Lu et al.

It is certified that error appears in the above-identified patent and that said Letters Patent is hereby corrected as shown below:

In the Claims

Column 23, Claim 11, Line 25    After "module", insert --obtaining--

Signed and Sealed this
Eighth Day of September, 2015

Michelle K. Lee
*Director of the United States Patent and Trademark Office*